Oct. 2, 1934.  A. C. FUHRMAN  1,975,206
BRAKE FOR DUAL WHEEL ORGANIZATION
Filed March 31, 1931  3 Sheets-Sheet 1

Oct. 2, 1934.   A. C. FUHRMAN   1,975,206
BRAKE FOR DUAL WHEEL ORGANIZATION
Filed March 31, 1931   3 Sheets-Sheet 2

Albert C. Fuhrman,
INVENTOR.

BY J. Stanley Burch
ATTORNEY.

Oct. 2, 1934.  A. C. FUHRMAN  1,975,206
BRAKE FOR DUAL WHEEL ORGANIZATION
Filed March 31, 1931  3 Sheets-Sheet 3
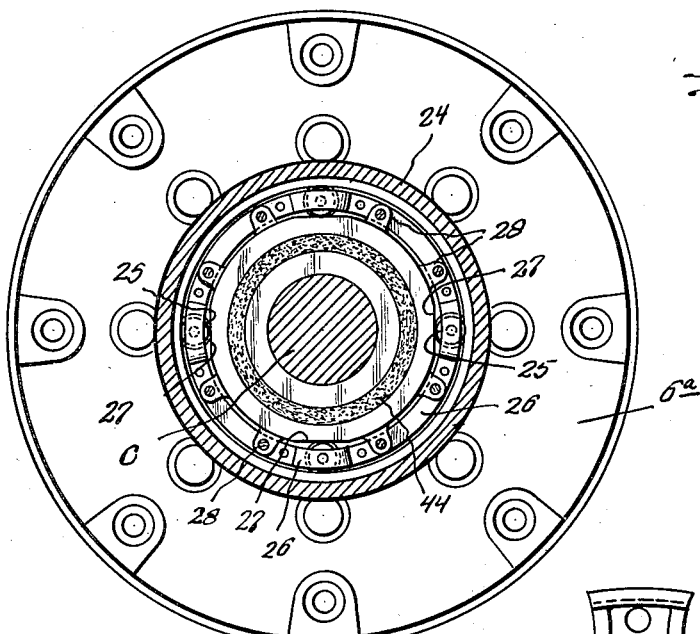
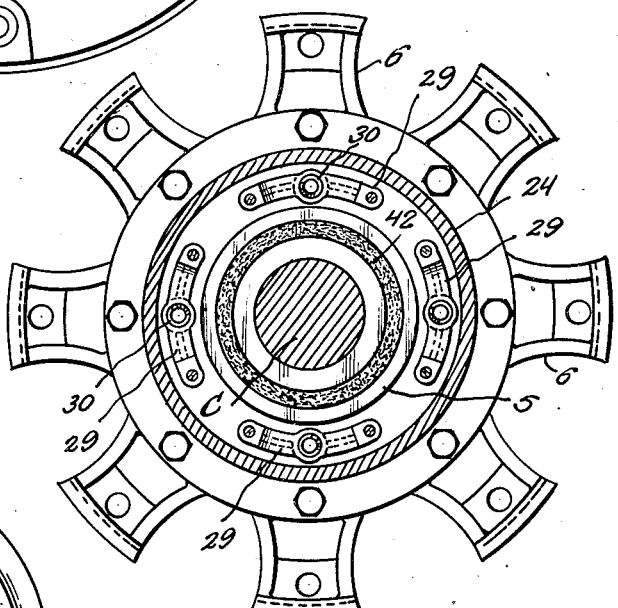
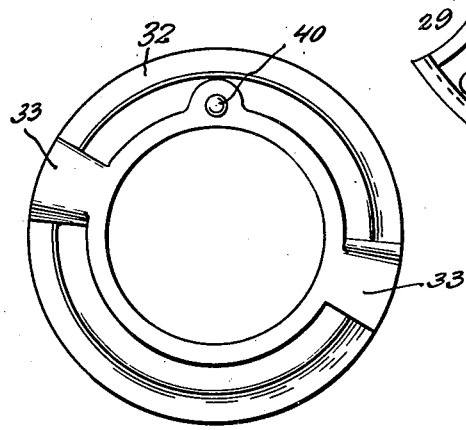
Albert C. Fuhrman,
INVENTOR.
BY *J. Stanley Birch*
ATTORNEY.

Patented Oct. 2, 1934

1,975,206

UNITED STATES PATENT OFFICE 1,975,206

BRAKE FOR DUAL WHEEL ORGANIZATION

Albert C. Fuhrman, Canton, Ohio

Application March 31, 1931, Serial No. 526,687

10 Claims. (Cl. 188—18)

This invention relates to improvements in dual tire wheel organizations of the type disclosed in my pending application for United States Letters Patent Ser. No. 515,108, filed February 11, 1931, wherein inner and outer wheel units are mounted on an axle for free relative rotation and with their hubs in substantially abutting end to end relation, whereby the wheel units are allowed to rotate independently of each other and at different speeds when making short turns.

The primary object of the present invention is to provide a dual wheel organization of the above kind in which the inner wheel unit has a manually operable brake associated therewith, and in which means is provided to lock the inner and outer wheel units together when said brake is applied, whereby the ground-engaging surfaces of the tires of both wheel units are used in the braking operation, or in stopping the vehicle equipped with such dual wheel organization.

More specifically, the present invention aims to provide a normally released clutch device between the inner and outer wheel units, a manually operable brake associated with the inner wheel unit, and means including a common operating shaft for simultaneously applying said brake and engaging such clutch device.

A further object of the invention is to provide a dual wheel organization of the above kind in which the clutch device and its actuating elements are so associated with the brake operating shaft and combined in the organization as to provide a comparatively simple and compact construction that is durable in use and thoroughly efficient and reliable in action.

Other objects and features of the invention will become apparent as the nature of the invention is better understood, and the same consists in the novel form, combination and arrangement of parts hereinafter more fully described, shown in the accompanying drawings and claimed.

In the drawings:

Figure 3 is a similar view taken substantially upon line 3—3 of Figure 1.

Figure 4 is a view similar to Figure 3 taken on line 4—4 of Figure 1.

Figure 6 is an inner face view of the rotatable and slidable cam disk forming part of the operative connection between the brake operating shaft and the clutch device between the inner and outer wheel units.

Figure 1:
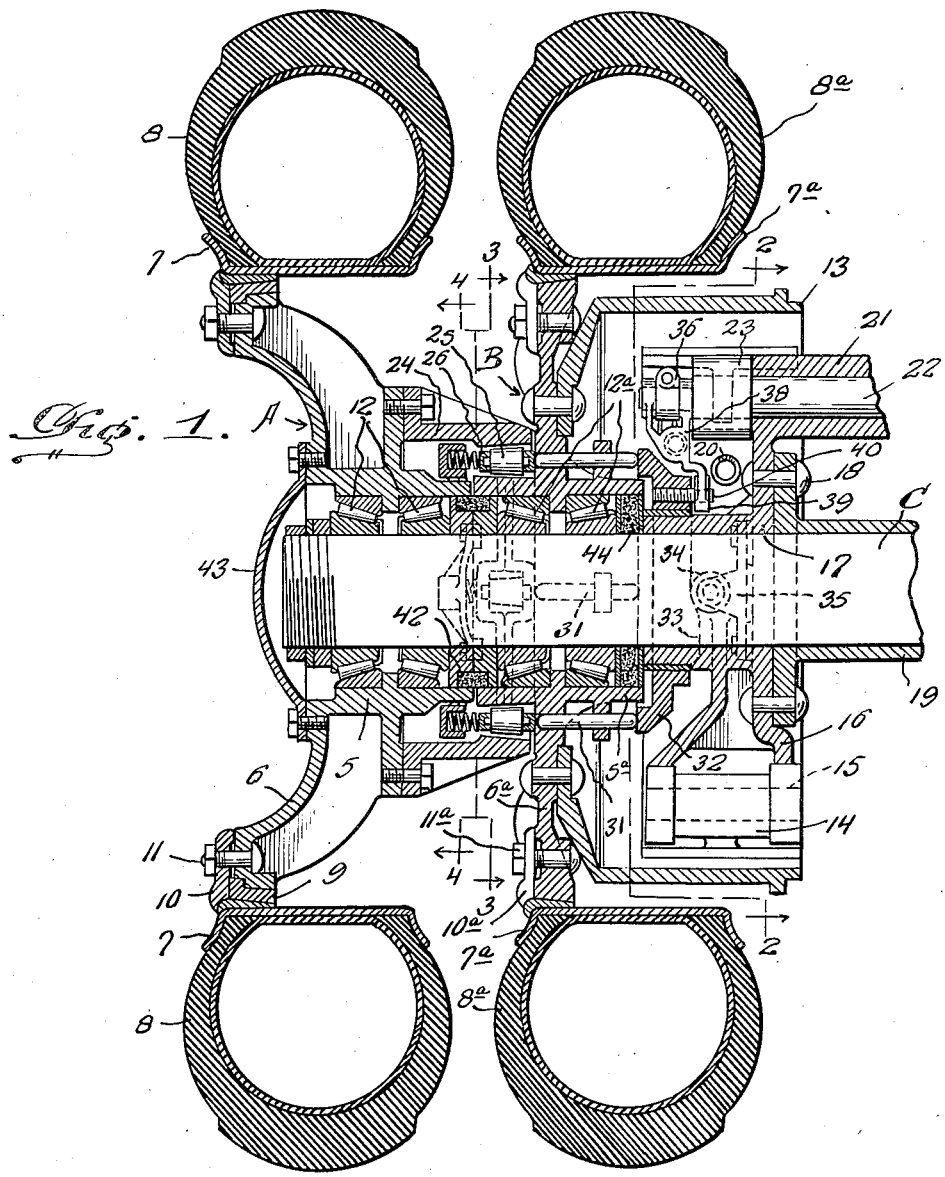
Figure 1 is a central transverse vertical section of a dual wheel organization embodying the present invention.
Figure 2:
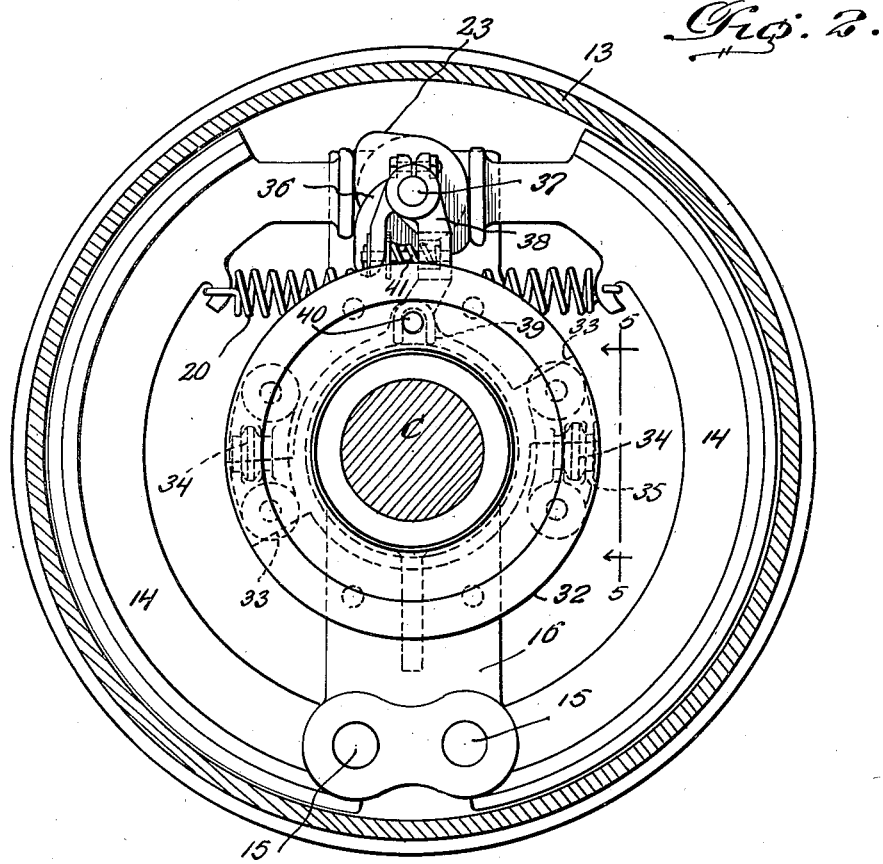
Figure 2 is a fragmentary vertical section on line 2—2 of Figure 1.
Figure 5:
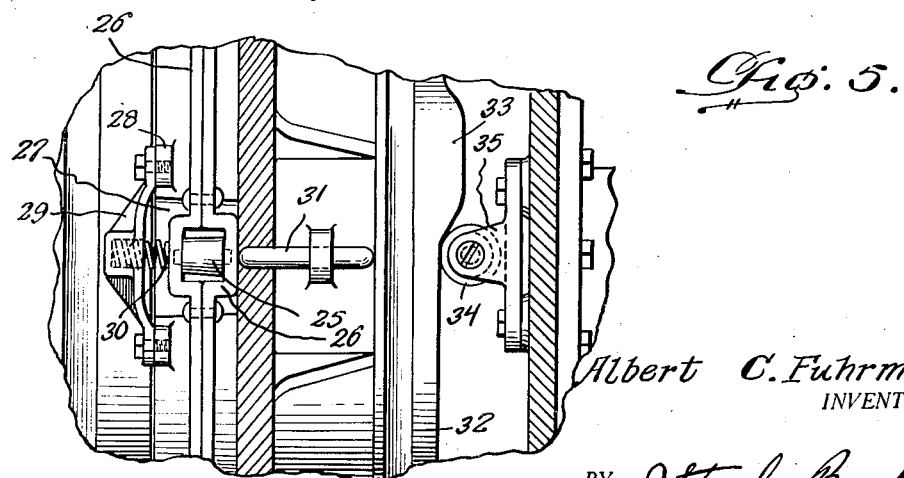
Figure 5 is an enlarged fragmentary section taken substantially upon line 5—5 of Figure 2.

Referring in detail to the drawings, the wheel organization shown includes an outer wheel unit A and an inner wheel unit B. The outer wheel unit embodies a hub member 5 having integral radial spokes 6 about which is mounted a rim 7 carrying a pneumatic or other cushion tire 8. Arranged about the spokes 6 is a removable tapered filler ring 9 upon which the rim 7 is seated and removably fastened by means of fastening lugs 10 bolted as at 11 to the spokes 6. Bearings 12 are arranged in the hub member 5 for rotatably mounting the outer wheel unit on the outer end of a supporting axle C.

The inner wheel unit B embodies a hub member 5a having integral radial spokes or an integral disk 6a about which is mounted a rim 7a carrying a pneumatic or other cushion tire 8a. The rim 7a is directly seated on the beveled outer ends of the spokes or outer edge of the disk 6a and removably fastened in place by means of lugs 10a bolted as at 11a to the spokes or disk 6a. The inner wheel unit B is rotatably mounted on the supporting axle by means of bearings 12a arranged in the hub 5a.

In accordance with the present invention, a brake drum 13 is fastened to the inner side of the inner wheel unit B to form part of a manually operable brake by means of which the inner wheel unit B may be stopped from turning so as to bring the vehicle, which is equipped with the present dual wheel organization, to a stop. While this manually operable brake may be of any well known or preferred construction, it is shown as including a pair of arcuate brake shoes 14 pivoted as at 15 to the depending member 16 of a supporting bracket or hanger 17 mounted on the axle C inwardly of the hub of the inner wheel unit B and rigidly fastened as at 18 to the adjacent flanged outer end of the rear axle housing 19. The brake shoes 14 are arranged within the drum 13 and normally contracted to released position by means of a helical tension spring 20 connecting the free upper ends of the brake shoes. The support or hanger 17 has an upward extension formed at its upper end with an integral cylindrical bearing 21 in which is journaled a rock shaft 22 parallel with the axle C. The outer end of the rock shaft 22 carries a cam 23 which is interposed between the upper free ends of the brake shoes 14 so that when the shaft 22 is rocked in one direction the said brake shoes 14 are expanded against the action of the spring 20 to engage the inner surface of the drum 13 and thereby restrain the inner wheel unit against rotation. The inner end of the rock shaft 22 may be connected by any suitable arrangement of links and levers with a hand lever disposed adjacent the driver's seat of the vehicle for convenient manual manipulation as is well understood in the vehicle brake art.

Rigidly secured to the outer wheel unit A in spaced concentric relation to and surrounding the inner end of the hub 5 and the outer end of the hub 5a of the inner wheel unit B is a clutch ring 24 having an outwardly tapered internal surface at its inner end portion as clearly shown in Figure 1. This tapered surface of the ring 24 surrounds the correspondingly tapered outer surface of the outer end portion of the hub 5a as is also clearly shown in Figure 1, and arranged between these tapered surfaces is a clutch device including tapered rollers 25 journaled in a floating cage or carrier ring 26 so as to be arranged at regular spaced intervals about the outer end of the hub 5a at points where the outer surface of the latter is flattened as indicated at 27 (see Figure 3). These flat surface portions 27 are disposed tangentially of the axis of the wheel units as will be readily understood, and it will be seen that the cage 26 is arranged adjacent and at the outer side of the disk 6a forming part of the inner wheel unit B. Projecting outwardly from the outer end of the hub 5a at opposite sides of each flattened portion 27 are ears 28 to which are fastened the ends of a bracket 29 which forms a carrier for and an abutment for the outer end of a helical compression spring 30 whose inner end abuts the cage 26 coincident with one of the tapered clutch rollers 25. A plurality of the springs 30 are thus mounted at spaced points about the inner end of the hub 5 and within the clutch ring 24 at the outer side of the cage 26 for normally urging the latter inwardly against the disk 6a of the inner wheel unit so that the clutch rollers 25 are released and the two wheel units are permitted to freely rotate independently of or relative to each other. In this released position, there is sufficient clearance between the rollers 25 and the opposed surfaces of the hub 5a and the clutch ring 24 so that riding of the rollers 25 on the flattened portions 27 will not cause binding or frictional engagement of such rollers with the tapered inner surface of the clutch ring 24. On the other hand, the arrangement is such that when the cage 26 is forced outwardly against the action of the springs 30, this clearance will be taken up, and due to the loose mounting of the rollers 25 in the cage 26, they will be forced outwardly into frictional and binding engagement with the tapered inner surface of the clutch ring 24 upon rotation of the cage 26 relative to the outer end of the hub 5a as influenced by engagement of said rollers 25 with the tapered inner surface of the clutch ring 24, providing the inner wheel unit is restrained from rotation by application of the brake and the outer wheel unit A continues to rotate relative to the inner wheel unit at a faster speed to a slight degree. This wedging action of the rollers 25 against the inner surface of the clutch ring 24 is caused by riding of said rollers on the flattened portions 27 toward the arcuate portions of the hub surface connecting the same. In other words, the action provided corresponds exactly with that of the well known types of automatic one-way clutches commonly employed in various forms of machinery. Accordingly, by actuating the clutch device simultaneously with the actuation of the brake for the inner wheel unit, the outer wheel unit may be substantially simultaneously clutched to the inner wheel unit so that the ground-engaging surfaces of the tires of both wheel units may be utilized in the braking operation. In order to actuate or apply the clutch device simultaneously with application of the brake for the inner wheel unit, I provide an operative connection between the rock shaft 22 and the clutch roller carrying cage 26. As shown, this operative connection includes a plurality of axially sliding pins 31 carried by the inner wheel unit B adjacent to and in surrounding relation to the inner portion of the hub 5a, the outer ends of said pins engaging the inner side of the cage 26, and the inner ends of said pins engaging the outer side face of a cam ring 32 rotatably and slidably mounted on the brake shoe support 17 at the inner end of the hub 5a. As shown, the cam ring 32 has a plane outer face, while the inner face thereof is provided with a plurality of cam lugs 33 arranged adjacent and adapted to ride against anti-friction rollers 34 journaled in suitable brackets 35 secured to the brake shoe supporting member 17. The rollers 34 thus act to thrust the cam ring 32 outwardly parallel with the axle C when said cam ring 32 is turned to cause the cam lugs 33 to ride onto and against the rollers 34. This sliding motion of the cam ring 32 is imparted to the pins 31 which in turn force the cage 26 outwardly against the action of the springs 30 so that the clutch rollers 25 are operatively positioned for automatically clutching the outer wheel unit to the inner wheel unit in the manner outlined above. Rotation of the cam ring 32 is effected upon application of the brake by means of a connection between said cam ring and the rock shaft 22 including an actuating lever 36 fastened upon the reduced outer end portion 37 of the rock shaft 22, a further lever 38 pivoted on the reduced portion 37 of the shaft 22 and having a forked lower end 39 engaging a pin 40 carried by the cam ring 32, and a yielding operative connection between the levers 36 and 38 including a compression spring 41 suitably mounted and interposed between the free lower end of the lever 36 and the intermediate portion of the lever 38. The yielding connection between the levers 36 and 38 permits forceful application of the brake without undue turning of the cam ring 32 with such sudden and positive force as might cause damage to the various parts of the clutch device and its operating mechanism. Obviously, as soon as the rock shaft 22 is turned to release the brake shoes 14, the compression of the spring 41 is relieved and then the lever 38 is actuated to return the cam ring 32 to normal position with its lugs 33 out of engagement with the rollers 34 so that the springs 30 may simultaneously urge the cage 26 inwardly and position the clutch rollers 25 in an inoperative position wherein free relative rotation of the wheel units is again permitted.

A suitable felt-washer packing 42 is mounted in the meeting ends of the hubs 5 and 5a to prevent leakage of grease out of the latter between their meeting ends, and the outer end of the hub 5 is closed by means of a fluid-tight cap 43 to hold grease within the hubs when packed therein. A further felt-washer packing 44 is provided in the inner end of the hub 5a between the inner one of the bearings 12a and the adjacent outer end of the brake shoe support 17, to prevent leakage of the grease out of the hub 5a between the inner end of the latter and said supporting member 17.

As in my co-pending application referred to above, the spokes 6 of the outer wheel unit A are slightly shorter than the spokes or the diameter of the disk 6a of the inner wheel unit B, and the filler ring 9 is used so that the rim 7a may be removed outwardly over the spokes 6 when the ring 9 and the rim 7 with its tire 8 are removed, despite the fact that the rims 7 and 7a are of the same diameter.

From the above description, it will be seen that the two wheel units are so associated that they are normally freely rotatable relative to each other for permitting differential rotation of the wheel units so that skidding of one of the tires is avoided in making short turns. At the same time, the two wheel units may be effectively locked together for utilizing the ground-engaging surfaces of the tires of both wheel units in the braking operation when the brake associated with the inner wheel unit is applied. More specifically, the clutch device is rendered operative substantially simultaneously with application of the brake, and is rendered inoperative substantially simultaneously with release of the brake, while both the brake and clutch are associated with a single or common actuating element which may be readily controlled from the driver's seat of the vehicle equipped with the present dual wheel organization.

What I claim as new is:

1. A dual wheel organization including inner and outer wheel units mounted in side by side relation for free relative rotation, a normally released clutch device operable manually for locking the wheel units together, and a manually operable brake associated with the inner wheel unit.

2. A dual wheel organization including inner and outer wheel units mounted in side by side relation for free relative rotation, a clutch device for locking the wheel units together against relative rotation, yieldable means for normally releasing said clutch device, a normally released brake associated with the inner wheel unit, manually operable means for applying said brake, and an operative connection between the brake operating means and the clutch device for rendering the latter operative upon application of the brake.

3. A dual wheel organization including inner and outer wheel units mounted in side by side relation for free relative rotation, a clutch for locking the wheel units together, and a brake associated with the inner wheel unit.

4. A dual tire wheel including inner and outer wheel units mounted in side by side relation for free relative rotation, a brake associated with the inner wheel unit, and means including a single operating element for simultaneously applying the brake and locking the wheel units together against relative rotation.

5. A dual wheel organization including inner and outer wheel units having hubs arranged in end to end relation and mounted for free relative rotation, the hub of the inner wheel unit having an outer end portion provided with an inwardly tapered outer surface formed with spaced tangential flattened portions, a clutch ring rigidly carried by the outer wheel unit and having a portion surrounding the outer end of the hub of the inner wheel unit and formed with an outwardly tapered inner surface, a cage loosely arranged between said tapered surfaces and carrying a series of tapered clutch rollers, yieldable means urging the cage inwardly to normally release said rollers from said tapered surfaces and to provide clearance between the rollers and said flattened surface portions, a brake associated with the inner wheel unit including a shaft operable for applying said brake, and an operative connection between said shaft and said cage for forcing the latter outwardly against the action of said yieldable means to automatically render the clutch rollers operative for locking the wheel units together when the brake is applied.

6. A dual wheel organization including inner and outer wheel units having hubs arranged in end to end relation and mounted for free relative rotation, the hub of the inner wheel unit having an outer end portion provided with an inwardly tapered outer surface formed with spaced tangential flattened portions, a clutch ring rigidly carried by the outer wheel unit and having a portion surrounding the outer end of the hub of the inner wheel unit and formed with an outwardly tapered inner surface, a cage loosely arranged between said tapered surfaces and carrying a series of tapered clutch rollers, yieldable means urging the cage inwardly to normally release said rollers from said tapered surfaces and to provide clearance between the rollers and said flattened surface portions, a brake associated with the inner wheel unit including a shaft operable for applying said brake, and an operative connection between said shaft and said cage for forcing the latter outwardly against the action of said yieldable means to automatically render the clutch rollers operative for locking the wheel units together when the brake is applied, said operative connection comprising a rotatable and slidable cam ring mounted on the axis of the wheel units, means for rotating said cam ring and forcing the same outwardly upon actuation of the brake applying shaft, and axially sliding pins carried by the inner wheel unit and interposed between the cam ring and said cage.

7. A dual tire wheel organization including inner and outer wheel units mounted in side by side relation for free relative rotation, a clutch ring rigid with the outer wheel unit and surrounding the outer end of the hub of the inner wheel unit, an axially slidable clutch device interposed between the clutch ring and the hub of the inner wheel unit and operable for locking the wheel units together, yieldable means for normally releasing said clutch device, a brake associated with the inner wheel unit including an operating shaft, and an operative connection between said operating shaft and said clutch device for effecting actuation of said clutch device upon application of the brake.

8. Structure of the class described comprising a pair of independently rotatable wheels, retarding means operable by remote control associated with one of said wheels, retarding means associated with the other wheel, and means carried by the first mentioned wheel operable on operation of said remotely controlled retarding means to actuate the retarding means on the second mentioned wheel.

9. Brake mechanism for a pair of dual wheels including a brake drum carried by one of the wheels and mounted between the two wheels, and retarding mechanism within the drum operable to retard its rotation.

10. In combination with a dual wheel assembly comprising a pair of independently rotatable wheels, retarding mechanism associated with each wheel operable to lock the wheels for rotation in unison upon application of the retarding mechanism associated with one of the wheels.

ALBERT C. FUHRMAN.